Jan. 22, 1957 W. H. LLOYD ET AL 2,778,606
HEAT EXCHANGERS
Filed Jan. 2, 1952 4 Sheets-Sheet 1

INVENTORS
William H. Lloyd,
Frank C. Disinger &
BY John R. Hayden
Willits, Helwig & Baillio
ATTORNEYS United States Patent Office 2,778,606
Patented Jan. 22, 1957

2,778,606

HEAT EXCHANGERS

William H. Lloyd, Frank A. Disinger, and John R. Hayden, Lockport, N. Y., assignors to General Motors Corporation, Detroit, Mich., a corporation of Delaware Application January 2, 1952, Serial No. 264,392

1 Claim. (Cl. 257—2)

This invention relates to heat exchangers, particularly those employed for cooling liquids, and to the method of manufacture thereof.

Heat exchangers, such for example as those employed for cooling the transmission oil of aircraft engines are required not only to operate efficiently and reliably under the most severe conditions of operation but must also be light in weight. It is also desirable that heat exchangers so employed be so constructed that they may fit into the confined spaces available on aircraft. The heat exchangers employed heretofore have not only been relatively heavy but also have been cumbersome and, accordingly, unsuitable for the exacting requirements of aircraft construction.

One object of the present invention is to provide a heat exchanger for cooling liquids, such as transmission oils having a relatively high capacity and yet requiring a minimum of space for installation.

Another object is to provide a heat exchanger of the stated character which is constructed substantially wholly of aluminum and therefore being extremely light in weight.

A still further object is to provide a novel by-pass tube arrangement which enables liquids, such as oil, to flow through a portion of the heat exchanger while in a relatively congealed state, the device being so constructed that when the oil becomes more mobile it will flow through the passages normally employed for the circulation thereof.

A further object is to provide in a by-pass circuit of the stated character a surge valve construction which opens when the system pressure reaches a predetermined value thereby preventing damage to the associated parts.

A still further object is to provide in the by-pass circuit of heat exchangers of the stated character, a thermostatically operable valve which closes the by-pass circuit when the temperature of the oil reaches a predetermined value thereby compelling the oil to flow through the tubes normally utilized for circulating the oil of the system.

A still further object is to provide a heat exchanger which is simple in construction, economic in manufacture, and highly efficient and durable in operation.

Other and further objects will become apparent as the description of the invention progresses.

Figure 1:
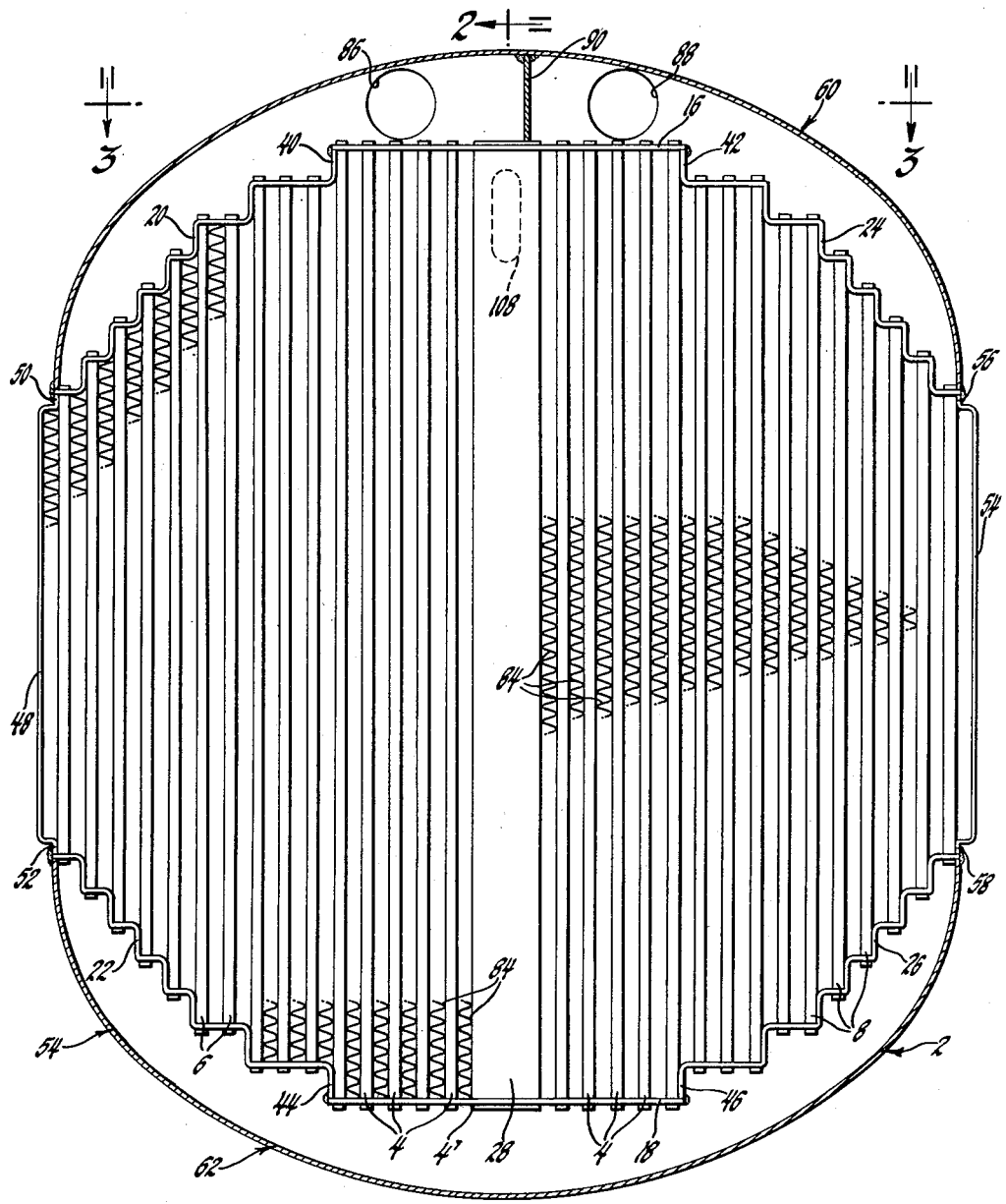
Fig. 1 is a side elevational view, partly in section, of the heat exchanger showing the arrangement of the tubes, the cooling fins disposed therebetween, and the tanks disposed at the opposite ends of the tubes.
Figure 3:
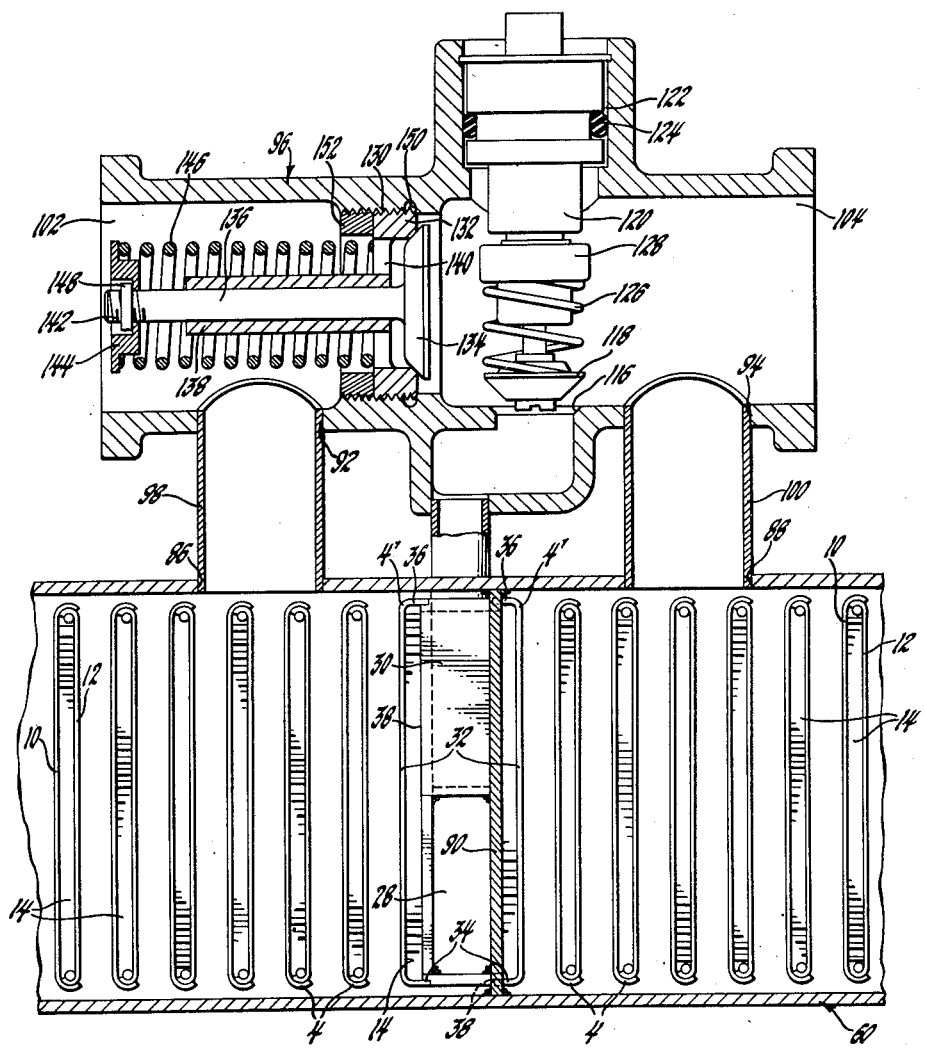
Figure 4:
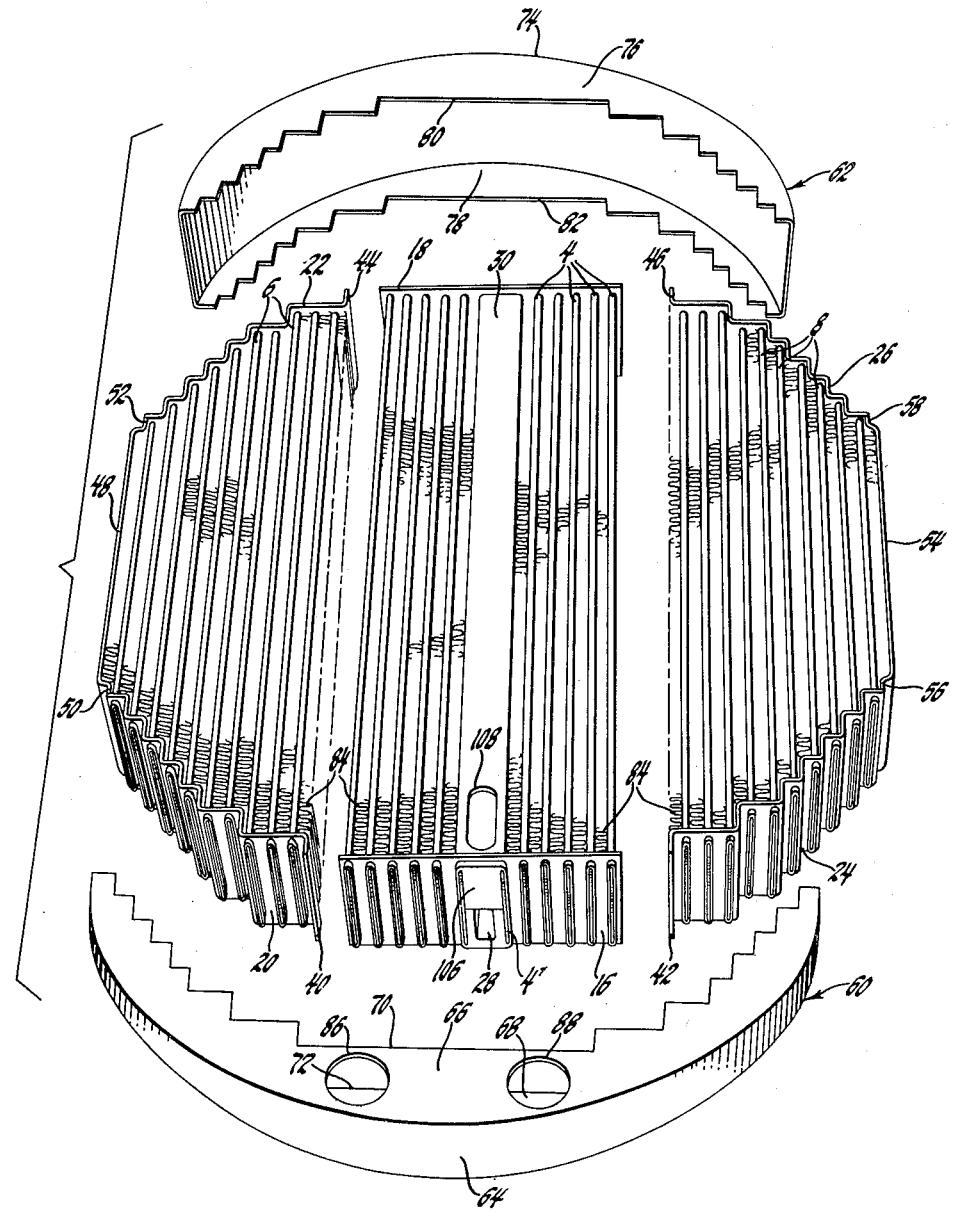

Fig. 3 is a sectional view taken substantially along 3—3 of Fig. 1, showing the arrangement of the oil circulating tubes, the by-pass tubes disposed therebetween, the fitting attached to the heat exchanger and the surge and thermostatically operable valves associated therewith, and Fig. 4 is an exploded perspective view showing the various groups of tubes and tanks associated with the heat exchanger proper.

Referring to the drawings, the numeral 2 designates generally the heat exchanger proper which consists of a central group of tubes 4 of substantially equal length and groups of different length tubes 6 and 8 disposed at either side of said middle group of tubes. The tubes 4, 6, and 8 are relatively flat and may be constructed of two spaced plates 10 and 12 shown in Fig. 3, which are lapped at the ends and secured together by brazing. Each of the tubes, 4, 6, and 8 is provided with an insert 14 which causes the oil flowing therethrough to follow tortuous paths and thereby come into contact with relatively large areas of the inner surfaces thereof while flowing therethrough. The inserts 14 may be of any suitable construction and for a detailed description of one form which they may take, reference may be had to the patent to Gerstung No. 2,360,123.

Tubes 4 are longer than tubes 6 and 8 and the opposite ends thereof extend through aligned slots provided in flat header plates 16 and 18. The tubes 6 are of varying lengths and also extend through aligned openings provided in stepped headers 20 and 22. Tubes 8 are generally similar to the group of tubes 6 and the opposite ends thereof also extend through aligned slots provided in stepped headers 24 and 26. Disposed centrally of the group of tubes 4 and extending in parallel relation therewith is a pair of enlarged tubes 28 and 30 which may be termed a "tube structure." Tubes 28 and 30 are of fabricated construction and are arranged in side by side relation to form a U-shaped passage, as shown more particularly in Figs. 2 and 3. The opposite ends of tubes 28 and 30 extend through enlarged correspondingly shaped recesses provided centrally of headers 16 and 18.

As shown more particularly in Fig. 3, the tubes 4' disposed at either side of by-pass tubes 28 and 30 are somewhat differently constructed than the tubes 4 disposed at either side thereof. Each tube 4' consists of a single plate 32, substantially U-shaped in cross section whose inwardly extending flanges 34 and 36 abut the side walls 38 of by-pass tubes 28 and 30. When the plates 32 have been arranged as shown in Fig. 3, they are effectively secured in position in fluid tight relation by brazing. As is clear in the drawings, the passages 28 and 30 are each so dimensioned as to have a larger width along its length than any of the tubes 4, 6 and 8.

Header plates 20 and 24 are provided with vertically extending flanges 40 and 42, respectively, which when the groups of tubes are assembled engage tubes 4 and lie immediately beneath the outer ends of header plate 16 as shown in Fig. 1. Headers 22 and 26 are also provided with similar vertical flanges 44 and 46 which lie in abutting relation with the inner end surfaces of header plate 18. A substantially U-shaped side plate 48 is provided at the extreme left-hand side (Fig. 4) of the group of tubes 6 and has aligned flanges 50 and 52 provided, respectively, at the opposite ends thereof which engage the inner surfaces of the outer ends of header plates 20 and 22. A similar side plate 54 is provided at the extreme right-hand side (Fig. 4) of the group of tubes 8. The aligned flanges 56 and 58 of plate 54 abut the inner surfaces of the outwardly extending ends of header plates 24 and 26. When the groups of tubes, header plates, and side plates, shown more particularly in Fig. 4, have been assembled as shown in Fig. 1 the parts are effectively secured in position by brazing. The joints between the tubes and the header plates are effectively sealed during the brazing process to prevent fluid leakage therethrough. The opposite ends of the groups of tubes 4, 6, and 8 are closed by upper and lower tanks 60 and 62. As shown more particularly in Figs. 1, 2, and 4, upper tank 60 is provided with a substantially arcuate top wall 64 and spaced parallel side walls 66 and 68. The inner edges 70 and 72 of side walls 66 and 68 of tank 60 conform with the general shape of headers 16, 20, and 24 and lie in abutting relation therewith when the said tank is assembled thereon. Tank 62 is generally similar to tank 60 and also comprises an outer arcuate wall 74 and spaced side walls 76 and 78. The inner edges 80 and 82 of side walls 76 and 78, respectively, conform with the shape of headers 18, 22, and 26 and are adapted to seat thereon as shown in Fig. 1. When the tanks 60 and 62 have been assembled on the header plates they are effectively secured thereto in liquid tight relation by brazing. Disposed between the tubes 4, 6, and 8 are sinuous shaped heat absorbing air centers or inserts 84. Inserts 84 are in the form of fin sheets and are placed between the tubes 4, 4', 6, and 8, and also between side plates 48 and 54 and the adjacent tubes 6 and 8, respectively, during the assembly process and are secured in intimate thermal contact with said tubes by brazing. The opposite sides of the heat exchanger 2 are open and consequently cooling air or other cooling fluid may flow between the tubes thereby absorbing the heat absorbed by the said tubes and inserts 84. The oil flows through the tubes 4, 4', 6, and 8 and is thus effectively cooled.

Tank 60 has provided in the side wall 66 thereof inlet and outlet ports 86 and 88. Tank 60 has also provided therein a transverse partition 90 disposed in substantial alignment with the right-hand side wall 38 (Fig. 3) of by-pass passages 28 and 30. Inlet and outlet openings 86 and 88 are connected to corresponding openings 92 and 94 of fitting 96 by short pipe connections 98 and 100, respectively. Fitting 96 is provided with an inlet portion 102 and an outlet portion 104 which may be connected to inlet and outlet connections (not shown) leading from the transmission housing of an engine or to any other source of fluid supply. It therefore is seen that the oil will enter the system through inlet opening 102 in fitting 96 and will then flow into the left-hand side (Fig. 1) of tank 60. The oil then flows through the tubes 4, 4' and 6 disposed to the left of partition 90 and into tank 62 and is then returned to the right-hand side of tank 60 through the tubes 4, 4' and 8 disposed to the right-hand side (Fig. 1) of said partition. The oil then flows through pipe 100 and into fitting 96 and then discharges from the latter through the outlet end 104.

Figure 2:
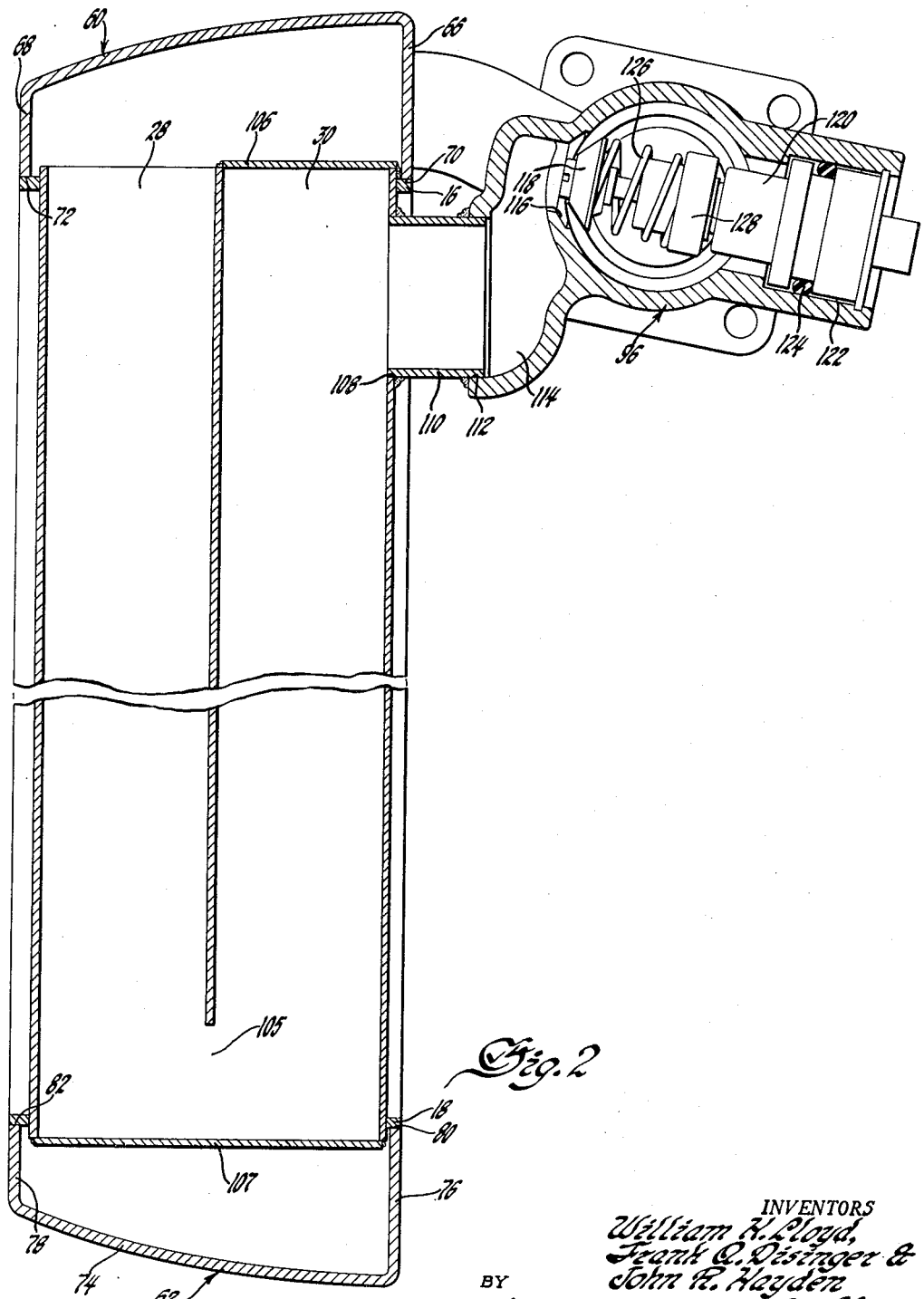
Fig. 2 is a sectional view taken substantially along line 2—2 of Fig. 1, showing the structure of the by-pass tubes of the heat exchanger and the thermostatically operable valve associated therewith.

In order to enable the flow of oil through the system when in a partially congealed state, the by-pass passages 28 and 30 are provided. As shown in Fig. 2, the upper end of passage 30 is closed by plate 106 and the lower end of both passages 28 and 30 are closed by plate 107. A communicating port 105 connects the lower ends of passages 28 and 30. Consequently, the oil entering tank 60 through pipe connection 98 will flow only through the inlet by-passage 28 thence through port 105 and return through passage 30. As shown more clearly in Figs. 2, 3, and 4 passage 30 has provided near the upper end thereof an opening 108 which is connected by a pipe connection 110 to a port 112 provided centrally of fitting 96. Port 112 communicates with a compartment 114 in fitting 96 which has provided at its outlet end a seat 116 for a valve element 118 operable both thermostatically and by pressure. Valve element 118 is operatively connected to a thermostatically operable structure 120 secured in any suitable manner in a recess 122 provided in the outer side of fitting 96. A ring seal 124 constructed of resilient sealing material prevents the escape of oil around thermostat structure 120. A coil spring 126 is secured at one end to valve element 118 and at the other end to the casing 128 of structure 120 which operates to unseat the said valve element when the temperature of the oil falls below predetermined value. The structure 120 is also so constructed that valve element 118 will unseat when the pressure operating thereagainst exceeds a predetermined value, as for example forty pounds per square inch regardless of the oil temperature. The thermostat and the expansible means associated therewith may be of any suitable construction and for a more complete description of one form thereof reference may be had to the patent to Vernet No. 2,368,182. The valve element 118 is normally open or unseated, as shown in Fig. 3, and the thermostat 120 is so designed as to cause said valve to remain in open position when the temperature of the ambient oil in the system is below a predetermined value, as for example, 185° F. When this temperature is exceeded, valve 118 closes thereby preventing further passage of oil through the by-pass passages 28 and 30. It is seen that upon operation of the engine the oil becomes heated and, consequently, becomes more mobile. Thus as circulation of oil takes place through passages 28 and 30 the walls 38 of said passages become heated. This heat is conducted to passage 4' disposed at either side of passages 28 and 30 thereby heating the walls thereof causing the oil to then flow therethrough. The heat from the oil passing through tubes 4' is conducted by the heat absorbing means 84 to the adjacent tubes in sequence. Upon heating of the tubes in this manner the oil therein will become mobile and will begin to flow therethrough. Once circulation begins the oil will continue to flow through the tubes thus heated and will cause heating of the tube next adjacent thereto causing the congealed oil therein to flow therethrough. This process is continued until all of the tubes have been warmed and circulation takes place through all of them. The same operation follows with respect to the tubes 4', 4, and 8 which return the oil to the portion of tank 60 at the other side of partition 90. As the temperature of the oil increases valve 118 will begin to close and when the temperature reaches the predetermined value for which the thermostat is designed the said valve will become fully closed and will shut off further flow of oil through by-passages 28 and 30. All of the oil entering tank 60 through inlet pipe 98 will now flow through the tubes 4, 4', and 6 and into tank 62 and then be returned to the portion of tank 60 disposed to the right of partition 90 through tubes 4', 4, and 8.

Inlet end 102 of fitting 96 has provided near the inner end thereof an internally threaded portion 130 which received an externally threaded ring valve seat 132 for a poppet type surge valve 134. The stem 136 of valve 134 is guided for reciprocating movement in a tubular guide member 138 secured in any suitable manner as by spider 140 which in turn is secured to the inner periphery of valve seat 132. The outer threaded end 142 of valve stem 136 extends through a seat 144 for a coil spring 146. Coil spring 146 extends between seat 144 and spider 140 and the tension thereof may be adjusted by manipulation of a nut 148 provided on the outer threaded portion 142 of valve stem 136. The valve seat 132 is held in proper position against an annular shoulder 150 provided interiorly of fitting 96 by an annular lock nut 152. As shown in Fig. 3, surge valve 134 is normally held against its seat 132 by spring 146. Consequently, during normal operation of the heat exchanger, the oil entering the inlet end 102 of fitting 96 will flow into tank 60 through pipe connection 98 and after passing through the heat exchanger 2 will flow into outlet end 104 of said fitting through pipe connection 100, as previously described. In the event that the pressure of the oil should increase above a safe value, as for example, ninety pounds per square inch, valve 134 will move away from its seat 132 against the action of spring 146, thereby permitting the oil to pass directly through fitting 96, thus by-passing the heat exchanger 2. These pressure conditions may be caused by surges of the oil and owing to the relative thin construction of the tubes might cause damage thereto. However, upon opening of valve 134 when such conditions occur, the oil will by-pass the heat exchanger proper and, accordingly, damage to the parts is thereby prevented.

From the foregoing description it is seen that a simplified and highly efficient heat exchanger has been provided. All of the parts including the tubes 4, 4', 6, 8, 28, and 30, the header plates 16, 18, 20, 22, 24, and 26 and the tanks 60 and 62 as well as the inserts 14 and 84 may be constructed of a light weight material such as aluminum and, accordingly, the heat exchanger as a whole is light in weight and especially adapted for use in aircraft. The parts may be readily assembled into groups and brazing material placed at the joints and contacting areas thereof and when the groups have been assembled the entire structure is then placed in a brazing furnace and effectively secured in fluid tight relation. This enables manufacture of heat exchangers at a relatively low cost. The heat exchanger is also provided with novel by-pass means which enables operation thereof when the oil is in a congealed state. By gradually heating the oil the various oil passages are progressively opened and consequently the device as a whole may be placed into efficient operation within a relatively short period of time. Protective devices have also been provided to prevent damage to the parts in the event that undue pressures occur in the system due to surging of the oil or otherwise. When this occurs, the oil by-passes the heat exchanger proper and damage to the tubes and other parts is prevented. The heat exchanger also has associated therewith a novel thermostatically operable valve mechanism which closes the by-passages when the temperature of the oil flowing therethrough reaches a predetermined value. When the oil reaches this temperature it is compelled to flow through the tubes 4, 4', 6, and 8 and thus effective cooling of the oil is assured.

While but a single embodiment of the invention has been shown and described herein, it is apparent to those skilled in the art that it may be embodied in other forms. It therefore is to be understood that it is not intended to limit the invention to the single embodiment disclosed but only by the scope of the claim which follows.

What is claimed is:

A heat exchanger comprising two elongated tanks, one of said tanks having a transverse partition dividing the interior into two compartments, a group of parallel tubes connecting one of said compartments with the other of said tanks, said one compartment having an inlet, a second group of parallel tubes connecting the other of said compartments to the said other of said tanks, the said other compartment having an outlet, adjacent tubes of each of said groups defining an air space extending in a direction transverse to said tanks, a fin sheet in said air space contacting the adjacent tubes, a tube structure extending from one of said tanks to the other between said groups of tubes and defining a U-shaped passage leading from said one compartment parallel with said tubes and communicating with the said outlet, said passage having a larger cross sectional width along its length than any of said tubes, temperature sensitive valve means associated with said outlet and arranged to control fluid flow through said passage, and said tube structure being aligned with said groups of tubes transverse to said air spaces.

References Cited in the file of this patent

UNITED STATES PATENTS

| | | |
|---|---|---|
| 1,005,028 | Harrison | Oct. 3, 1911 |
| 1,173,805 | Johnson et al. | Feb. 29, 1916 |
| 1,505,701 | Cox | Aug. 19, 1924 |
| 2,164,605 | Young | July 4, 1939 |
| 2,174,677 | Young | Oct. 3, 1939 |
| 2,232,562 | Sandberg | Feb. 18, 1941 |
| 2,323,994 | Hilt | July 13, 1943 |
| 2,340,181 | Geddes | Jan. 25, 1944 |
| 2,360,123 | Gerstung et al. | Oct. 10, 1944 |
| 2,396,053 | McEntire | Mar. 5, 1946 |
| 2,449,696 | Geddes et al. | Sept. 21, 1948 |
| 2,460,754 | Kidd | Feb. 1, 1949 |
| 2,480,706 | Brinen | Aug. 30, 1949 |
| 2,573,161 | Tadewald | Oct. 30, 1951 |
| 2,621,900 | Borg | Dec. 16, 1952 |
| 2,642,897 | Bell | June 23, 1953 |

FOREIGN PATENTS

| | | |
|---|---|---|
| 253,233 | Great Britain | Mar. 10, 1925 |
| 481,755 | Great Britain | Mar. 17, 1938 |